Jan. 24, 1967 D. T. BRAY ET AL 3,300,344
FUEL CELL HAVING ZIRCONIA-CONTAINING
ELECTROLYTE AND CERAMIC ELECTRODES
Filed June 27, 1962 2 Sheets-Sheet 2
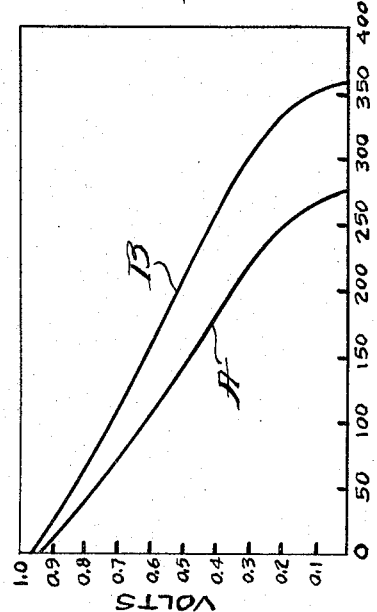
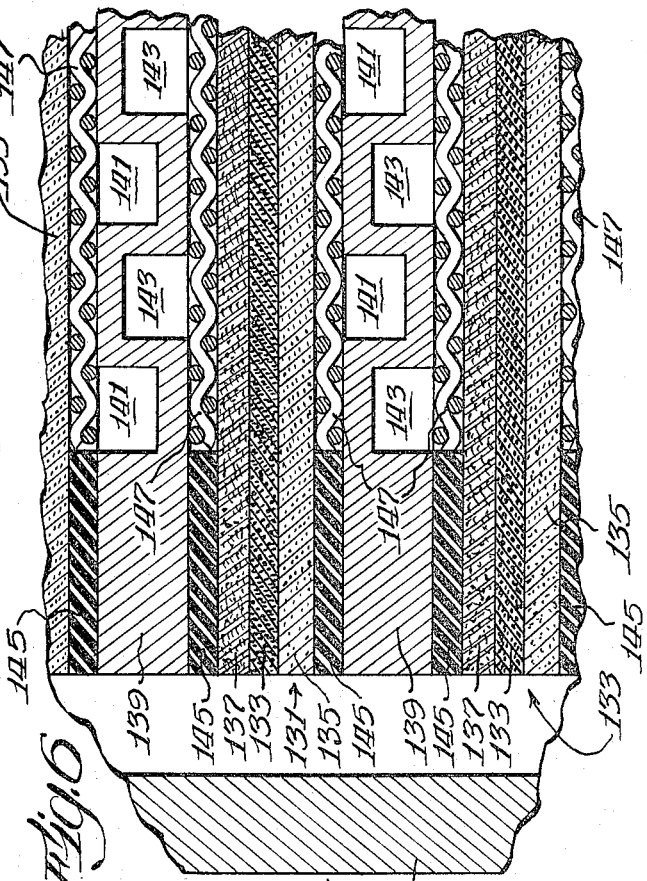
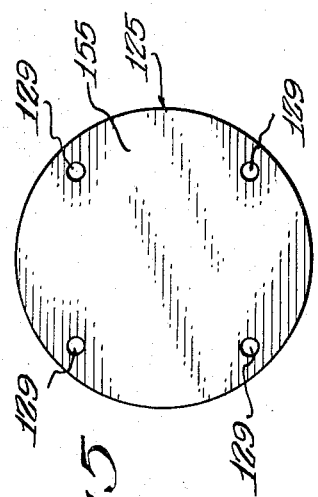
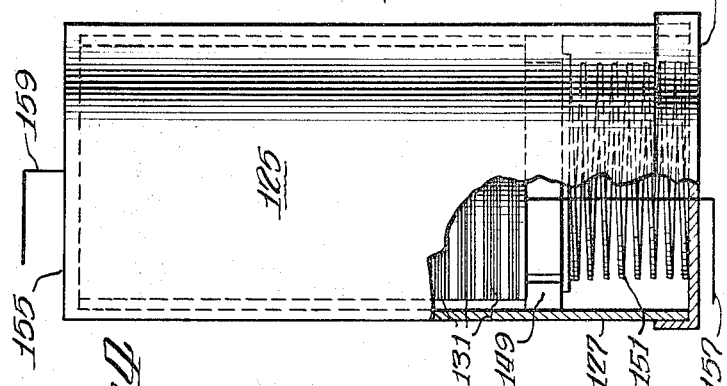
Inventors:
Donald T. Bray
Lee D. La Grange
Ulrich Merten
Charles D. Park
By Soans, Anderson, Luedeka & Fitch Attys

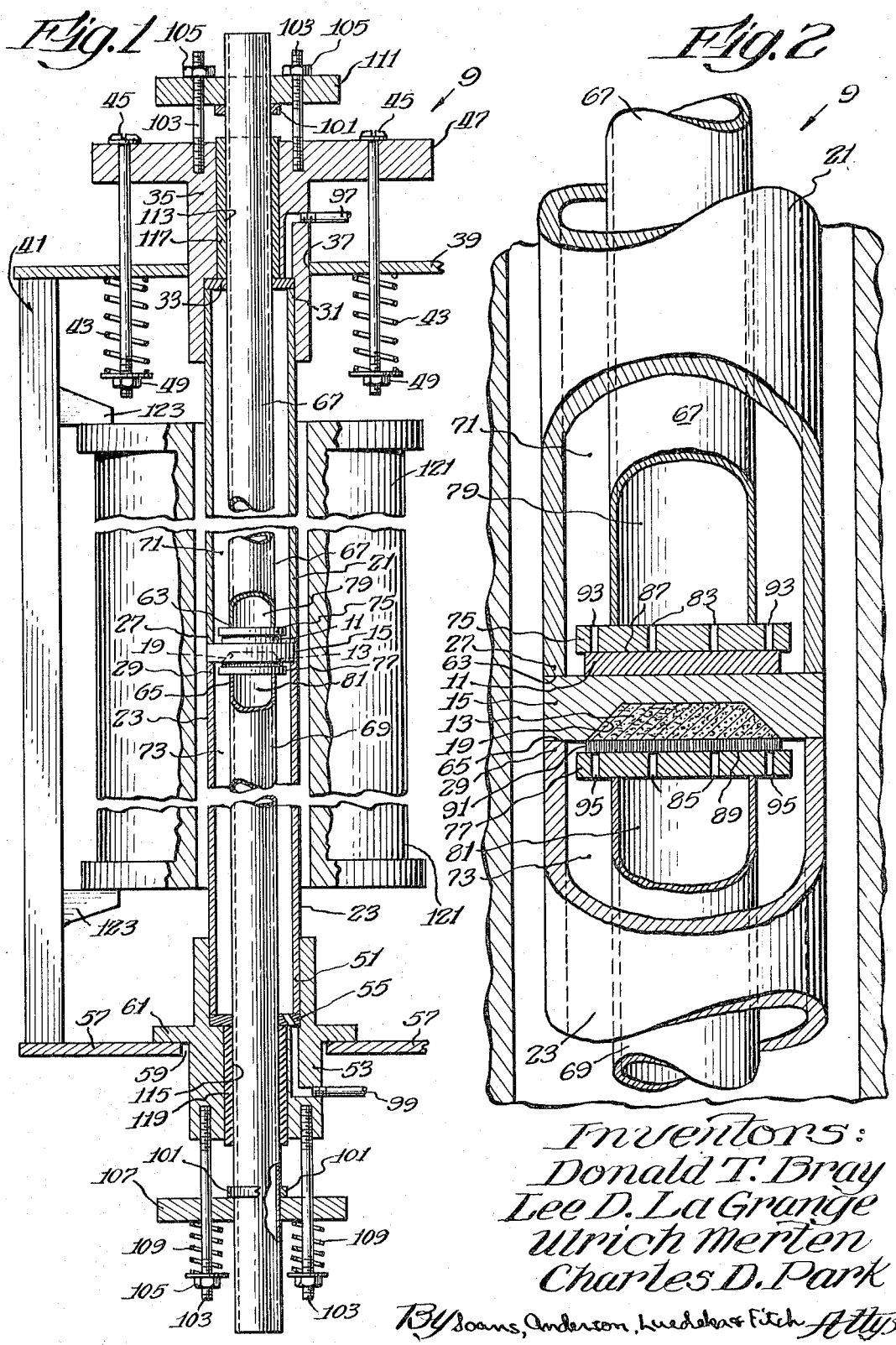

United States Patent Office 3,300,344
Patented Jan. 24, 1967

3,300,344
FUEL CELL HAVING ZIRCONIA-CONTAINING ELECTROLYTE AND CERAMIC ELECTRODES
Donald T. Bray, La Jolla, Lee D. La Grange, San Diego, Ulrich Merten, Solana Beach, and Charles D. Park, San Diego, Calif., assignors to General Dynamics Corporation, New York, N.Y., a corporation of Delaware
Filed June 27, 1962, Ser. No. 205,670
3 Claims. (Cl. 136—86)

The present invention generally relates to fuel cells and more particularly relates to high temperature solid electrolyte fuel cells.

The fuel cell is an electrochemical device for converting the energy of chemical fuels directly into electrical energy. The fuel cell is somewhat similar to a storage cell but does not store energy in the manner of a storage cell. Instead, it continuously generates direct current during operation, depending on a continuous feed system in which the fuel (usually hydrogen, carbon monoxide or hydrocarbon gas) and oxidant (usually air or oxygen) are fed into the cell continuously from external sources. The fuel cell contains no moving parts, except in auxiliary equipment, and is theoretically capable of yielding high energy conversion efficiency since its theoretical efficiency depends only on the ratio of free energy-to-heat content in the fuel compound and is not limited by Carnot-cycle considerations.

A fuel cell basically comprises three components: an anode, a cathode and an electrolyte. The anode and cathode are in contact with the electrolyte, and electrically connected through an external circuit.

The electrolyte must be an ionic conductor with acceptably low resistance, capable of transporting an ionic reaction product from one electrode-electrolyte interface to the opposite electrode-electrolyte interface. The electrolyte should be essentially electronically non-conductive in order not to short-circuit the system. On the other hand, the anode and cathode must be good electronic conductors. The electrodes must catalyze the anodic and cathodic reactions with the fuel and oxidant so that such reactions can proceed at sufficiently high rates to achieve good efficiency and high current density in the fuel cell.

The interaction of the reacting gas, electrode and electrolyte usually occurs at the electrode-electrolyte interface. This usually requires that the electrodes be porous enough to admit the reacting gases.

Various types of fuel cells have been constructed in the past but have encountered difficulties in providing sufficiently high current densities to render them useful and also sufficient durability to provide an extended operation life. Certain of such fuel cells employ aqueous or other liquid electrolytes and operate at or about room temperature. However, such fuel cells are generally characterized by relatively slow cathodic and anodic reaction rates.

Several types of fuel cells employ molten electrolytes and operate at substantially higher temperatures. One such cell employs molten carbonates. However, with cells of the molten type, although reaction rates may be satisfactorily high, such difficulties have been encountered as, for example, the problem of containment of the molten electrolyte, corrosion of the electrodes or other cell components, etc.

High temperature fuel cells utilizing a solid electrolyte offer a potentially satisfactory approach to the problem of providing an efficient fuel cell having high current densities at operating temperatures. Thus, an inert solid electrolyte would remove the indicated problems of corrosion and containment. However, most solid ionic-conducting materials which could be used as the inert electrolyte have undesirably high resistance to the flow of ions therethrough, in contrast to liquid or molten electrolytes, and therefore the solid electrolyte must be made relatively thinner. This introduces problems in the preparation and mechanical support of suitable cell members. Moreover, some materials which could be used as solid electrolytes do not have the required low electronic conductivity.

In addition, difficulties generally arise in providing suitable electrodes for a solid electrolyte fuel cell. Thus, if high current densities are to be achieved and sustained in such a fuel cell, the reactions must continue to behave essentially reversibly at the electrodes, even under conditions of high current drain. Pronounced voltage drops at the electrode-electrolyte interface must be avoided. The reactants must be efficiently brought into intimate contact with and removed from intimate contact with the electrodes and such interface.

Polarization is a term applied to indicate the irreversible voltage (free energy) losses in a cell when a finite current is flowing and includes such items as electrical resistance of the electrode materials, ionic resistance of the electrolyte, and resistances at the contact point between the electrodes and the electrolyte, concentration gradients of the reactants, and driving forces required to obtain useful reaction rates. A high temperature solid electrolyte fuel cell, in order to be economically useful, should be durable, i.e., capable of operating satisfactorily over long periods of time, despite thermal cycling and the like, without excessive polarization when the cell is operating at a useful power output.

The above-indicated problems have now been overcome in the construction of an efficient, durable and stable solid electrolyte fuel cell for high temperature use, which cell is capable of providing relatively high current densities. In the fuel cell of the present invention, a solid electrolyte is provided which exhibits essentially ionic conduction at temperatures of between about 600 and about 1300° C. The cell also includes electrodes which function without excessive polarization at the electrode-electrolyte interfaces. Moreover, the electrodes and the electrolyte of the improved fuel cell are durable and stable at high temperatures for extended periods of time. The electrolyte is specially arranged with respect to one or both of the electrodes so as to increase the structural strength of both the electrolyte and the electrode(s). Moreover, the electrodes are of an improved type. The fuel cell can be constructed so as to include a plurality of the electrode-electrolyte units interconnected to one another in a manner to provide power at high voltage with reduced requirements for current collection and transmission at the electrodes.

Accordingly, it is the principal object of the present invention to provide a durable, stable, solid electrolyte fuel cell which efficiently provides high current densities. It is also an object of the present invention to provide a durable solid electrolyte fuel cell capable of efficiently operating at temperatures of between about 600 and 1300° C., over extended periods of time. It is a further object of the present invention to provide a high temperature solid electrolyte fuel cell which has minimal polarization effects at useful power outputs. It is a further object of the present invention to provide improved solid electrodes for a high temperature solid electrolyte fuel cell, which electrodes are durable and minimize polarization effects at the electrode-electrolyte interfaces. It is also an object of the present invention to provide an electrolyte for a solid electrolyte fuel cell, which electrolyte exhibits suitable ionic conductivity and low electronic conductivity. It is also an object of the present invention to provide improved solid electrolyte fuel cells, which cells may be assembled into a battery of electrode-electrolyte units or assemblies interconnected to provide power at high voltage while minimizing electrode current collection requirements.

Further objects and advantages of the present invention will be apparent from a study of the following detailed description, and of the accompanying drawings, of which:

FIGURE 1 is a side elevation, partly in section, of an operating experimental embodiment of a fuel cell assembly incorporating the principles of the present invention;

FIGURE 2 is an enlarged fragmentary view of a portion of the embodiment of FIGURE 1;

FIGURE 3 is a graph depicting the current-voltage characteristic of the fuel cell of FIGURE 1, operated with air as the oxidant and a 10% hydrogen-90% nitrogen mixture of fuel at 1000° C.;

FIGURE 4 is a side elevation, partly broken away, of a further embodiment of the present fuel cell, wherein electrode-electrolyte assemblies are arranged in series;

FIGURE 5 is a plan view of the embodiment of FIGURE 4; and

FIGURE 6 is an enlarged fragmentary view of a portion of the embodiment of FIGURE 4.

Now referring more particularly to FIGURE 1 of the accompanying drawings, an operating experimental embodiment of a fuel cell 9 in accordance with the principles of the present invention is illustrated. The fuel cell 9 of FIGURE 1 comprises a pair of electrodes, that is, a cathode 11 and an anode 13, each generally in the form if a thin disk, in contact with opposite faces of a thin disk 15 of solid electrolyte, as more particularly shown in FIGURE 2. At least one of the electrodes is firmly bonded to and fixedly supports the electrolyte layer. Means are also provided, as more particularly described hereinafter, for passing reacting gases into and out of contact with the porous electrodes, for heating the electrode-electrolyte combination to operating temperature, for holding the fuel cell in position in the fuel cell assembly, and for recovering the direct current developed by the fuel cell.

The cathode 11 is constructed of a selected metal, metal oxide or a mixture thereof which has been found to operate effectively at high temperatures with acceptably low voltage drop. The cathode 11 cooperates with oxidant (oxygen or air) and is in contact therewith, with the electrolyte and with electrons passing thereto through the external circuit (not shown) interconnecting the anode and cathode. Oxide ions are provided at the cathode-electrolyte interface with acceptably low polarization. These oxide ions pass through the disk 15 of solid electrolyte towards the anode 13. At the anode-electrolyte interface electrons are given up to the external circuit (not shown) at a more negative potential than that from which they were received at the cathode, which will tend to flow back to the cathode through the external circuit as direct current, as the result of interaction between the oxide ions, reacting gas (hydrogen, carbon monoxide or hydrocarbon gas) and anode 13. This interaction is accomplished without excessive polarization. Water, carbon dioxide, or both, are formed as products of the reaction between reacting gas and oxide ions.

The cathode should be relatively porous. It may comprise one or more suitable metals, oxides of metals or mixtures. A particularly suitable cathode material for the purposes of the present invention is manganese oxide, which is stable under operating conditions, but is capable of assisting the oxygen to enter the electrolyte without excessive polarization. A second suitable cathode material has been found to be copper oxide. Manganese oxide has been found to be slightly more suitable than copper oxide under most high temperature fuel cell conditions, for example, at about 900–1000° C. Another suitable cathode material is cobalt oxide. Nickel oxide, platinum, silver and silver-copper alloys and mixtures can also be used.

The cathode can be fabricated from the indicated or similarly functioning oxide materials in any suitable manner, as by hot pressing, sintering or other refractory-forming techniques. In this connection, for example, if the cathode is to be formed separately from the electrolyte, cathodic material such as manganese oxide powder can be suitably pressed together to desired shape, utilizing a suitable binder such as stearic acid. It can then be fired to a suitable sintered material. The firing time, for example, can be about 2 hours at 1450° C. to provide, for example, a product having a 25 to 30 volume percent porosity. If copper oxide is used, instead of manganese oxide, a typical method of fabrication of the material to the shape of a small disk involves pressing reagent grade copper oxide particles together with stearic acid or similar binder, and then firing in air for 4 hours at 900° C.

It will be obvious that other suitable fabrication techniques can be used, depending upon the nature of the constiuents thereof, so as to provide the finished cathode 11 in suitable size and shape. The cathode 11, as is the case with the anode 13, should be thick enough to support good electrical conduction, but the cathode preferably is not thicker than about 0.05 inch. Its overall size can be varied to somewhat approximate that of the solid electrolyte disk 15 utilized in the fuel cell 9. Where the cathode is not actually joined to the solid electrolyte, as subsequently described, the cathode surface abutting that of the electrolyte disk is preferably smooth to assure good contact with the electrolyte. Pressure contact between the electrolyte disk and cathode can be achieved by means hereinafter more fully described.

The anodic material utilized in the solid electrolyte fuel cell is, like the cathode, selected to operate at high temperature under cell operating condition without excessive voltage drop. For such purposes, a metal which can catalyze reaction of hydrogen and the oxygen ion to form water and electrons can be used. It has been found preferable to use nickel as the anodic material. Cobalt metal can also be used, as well as other suitable metals, such as chromiun or platinum or metal oxides such as titanium oxide. Suitable mixtures can also be used. The anodic metal or oxide normally has a substantially different coefficient of thermal expansion than the material used in the solid electrolyte of the fuel cell 9. Accordingly, it is preferred, in order to avoid difficulties which might be encountered due to such differential thermal expansion, to provide the anode material in particulate form dispersed within a supporting matrix of porous ceramic material having a coefficient of thermal expansion approximating that ($\pm 10$ percent) of the electrolyte material. More preferably, a porous form of the electrolyte material itself is used as the matrix for the anode, thereby assuring substantially identical coefficients of thermal expansion. The anodic material should be in sufficient concentration in the matrix to afford effective electrical conductivity for the anode. Where the anode and electrolyte are bonded together, cracking therebetween is avoided during thermal cycling of the fuel cell. It will be understood that dispersing of electrode metal or oxide in a porous matrix of ceramic or refractory material can be carried out for either or both electrodes of the fuel cell, i.e., the cathode as well as the anode, in the described manner, in order to reduce the differences in the coefficients of thermal expansion of the electrolyte and electrode(s).

Either the cathode or anode, or both, is bonded to the solid electrolyte to improve the contact at the electrolyte-electrode inteface and in order to increase the strength and durability of the electrolyte-electrode assembly while maintaining each component sufficiently thin to minimize electrical resistance. Thus, for example, as hereinafter more particularly described with reference to FIGURE 2 of the accompanying drawings, the anode (or cathode) is designed to effectively operate as a mechanical support for the thin disk of electrolyte.

The anode can be formed by any suitable fabricating technique. Preferably, however, the anode is formed by a hot pressing technique. As an example, anodic material in the form of finely divided powder is dispersed in a suitable concentration, for example, a volume ratio of about 1:6, in a powdered matrix of electrolyte material. As shown in FIGURE 2, the anode 13 is then disposed in a cup-like depression in one side of the unpressed electrolyte powder and pressed to a solid porous body.

Preferably the anode and electrolyte disk 15 are formed by a single suitable fabricating technique, such as the following: A suitably shaped graphite ram is placed in a graphite die and a finely powdered mixture of electrolyte material, such as zirconia ($ZrO_2$) and yttria ($Y_2O_3$), hereinafter more fully described, is placed on top of the ram. The zirconia-yttria mixture is one which is reactive in the sense that it is readily sinterable to a low gas permeability product. Such material can have been converted to the desired reactive solid solution form by technique such as that more particularly set forth in co-pending United States application, Serial No. 210,221, filed July 16, 1962, of which Lee D. La Grange and William A. Steele are the inventors. In accordance with the method set forth in the indicated co-pending application, an aqueous solution containing dissolved salts of the desired oxides, for example, zirconyl nitrate and yttrium nitrate, and which contains a small concentration of selected sintering aid can be slowly dropped onto a hot surface having a temperature sufficiently high to allow the water and nitric acid to rapidly evaporate therefrom. $NO_2$ is also evolved. The product is a friable mass of intimately mixed oxides which can be easily pulverized. The powdered oxide thus obtained is in an active form which can be hot pressed at 3000 p.s.i. and less than 1400° C. to a low gas permeability relatively high density ceramic.

Such zirconia-yttria mixture is then shaped into a disk shape having a dished-out portion 19, as shown in FIG-2, by use of appropriate tools. The dished-out portion 19 is filled with a mixture of powdered nickel oxide, powdered carbon in sufficient quantity to reduce the oxide to nickel metal on heating, and a relatively unreactive form of the zirconia-yttria powder (preferably $-100+200$ mesh).

Such unreactive form, that is, a form which can usually only be sintered or hot pressed to a relatively porous product, can be prepared in any suitable manner, as by previous firing to a high temperature. For example, reactive powder produced as decribed above, can be mixed with a ⅔ volume of finely divided carbon and fired in air to 1500° C., until the carbon is burned out. The resultant cake is crushed to −100 mesh.

As another example, reactive powder can be fired to at least sintering temperature (1375° C., or above, preferably about 1700° C.) by regrinding to desired particle size.

An upper ram with a flat face is then used to compress the powdered anodic mixture in the dished-out portion 1 to form a flat face, as shown in FIGURE 2.

In order to provide an anode-electrolyte assembly the materials prepared as described must now be hot pressed. For example, it can be heated, as more particularly set forth in the previously indicated co-pending United States application, to sintering temperature for example, about 1360° C., during 5–30 minutes under a ram pressure of up to 5000 p.s.i. or more (preferably about 3000 p.s.i.) and may be maintained under such pressure and at the sintering temperature for a limited period of time, for example, up to 5 minutes, followed by careful cooling under no pressure to ambient temperature. The gas porous anode 13 (porosity preferably about 20–35 percent) of FIGURE 2 is thus formed, together with the electrolyte disk 15 having low gas permeability (preferably below 1 percent and more preferably below ½ percent porosity), the anode 13 being bonded to the disk 15 to form a unitary durable structure.

The solid electrolyte having low porosity so as to be substantially gas impermeable, comprises a mixture of a major component, preferably zirconia ($ZrO_2$), into the crystal structure of which are substituted metal atoms of the lesser component, which may be an alkaline earth oxide such as calcia, or a rare earth oxide, or yttria or scandia, or a mixture of two or more of these oxides. Preferably, yttrium atoms are substituted for the zirconium atoms. Thus, yttria ($Y_2O_3$) is preferably utilized as the lesser ceramic component. It has been found that a concentration of about 7 to 20 mol percent, preferably about 10 mol percent, of the yttria in the zirconia provides the desired characteristics. At such concentrations, the yttria is in solid solution and the resistivity of the system is about 10 ohm-cm. at 1000° C., for material hot pressed as described above. The oxide vacancies provided in the cubic crystal structure of the zirconia by the yttria provide holes for easier movement of the oxide ion through the solid electrolyte.

Other suitable solid electrolytes can also be formed. For example, a zirconia-calcia (CaO) system can be used. In such a system, the calcia is in solid solution in zirconia, at from about 15 to about 25 mol percent. For best results, the concentration of calcia should be about 15 mol percent, i.e., about 15 percent of the zirconium atoms should preferably be replaced by calcium atoms in the zirconia crystal structure. This provides the same type of oxide ion conductivity as described for the zirconia-yttria system.

The solid electrolyte is essentially electronically non-conductive at the operating temperature of the fuel cell. Moreover, it is fabricated in the form of a disk or plate which is as thin as is practical while still being essentially impermeable to both diffusional and differential pressure mass transport gas flow. For example, the resistance of zirconia—10% yttria at 1000° C., is about 10 ohm-cm. A 0.020 inch thick electrolyte disk thereof will cause, at a current of 100 ma./$cm.^2$, a voltage drop across the electrolyte disk of about 0.05 volt. This is an acceptably low voltage drop, since a typical open circuit voltage under operating conditions is about 1 volt. The diameter of the electrolyte disk 15 can vary, depending on the fuel cell parameters. It may be, for example, 1 inch for the embodiment of FIGURE 1, although diameters up to 6 inches or more can be effectively utilized with this and other embodiments of the fuel cell.

The solid electrolyte disk 15 can be fabricated to suitable size and shape by any fabricating technique which places the components in solid solution and which provides the product with requisitely low gas permeability. The preferred technique for production of the gas porous anode and low gas permeability electrolyte disk simultaneously has been described.

Now referring again more particularly to FIGURE 1 of the accompanying drawings, the electrolyte disk 15 is securely held in position in the fuel cell by hollow tubes 21 and 23 formed of a suitable high temperature refractory material, such as alumina. The ends 27 and 29 of tubes 21 and 23, respectively, engaging the disk 15 are smooth and level to minimize gas leakage around the edges of disk 15.

The opposite end 31 of tube 21 is held against a high temperature plastic (such as Teflon) seal 33, inserted into a brass fitting 35 which slides freely through an opening flange 37 in one arm 39 of a support frame 41. Two compression springs 43 exert a force towards the electrolyte disk 15 on the brass fitting 35 through the two bolts 45 and the two arms 47 of the brass fitting 35. The two nuts 49 on the bolts 45 can be tightened or loosened to force tube 21 into a tighter or looser engagement with disk 15 against tube 23. For this purpose, end 51 of tube 23 is pressed against a second suitably shaped brass fitting 53 through a second seal 55 of Teflon or the like. The fitting 53 is pressed against a second arm 57 of frame 41 against and extending through an opening 59 in said second arm 57, as shown in FIGURE 1. Further travel through opening 59 by the brass fitting 53 is prevented by lug 61.

Ends 63 and 65 of hollow high temperature metal (for example, nickel-chromium alloy) tubes 67 and 69, respectively, which are disposed centrally of tubes 21 and 23, respectively, and spaced inwardly therefrom to provide annular gas passageways 71 and 73, respectively, are provided with flat ended high temperature metal electrode holders 75 and 77, respectively, which holders extend across the ends 63 and 65 of tubes 67 and 69, respectively. The hollow high temperature metal tubes 67 and 69 provide gas passageways 79 and 81 in communication with holes 83 and 85 which extend to the outer faces 87 and 89 of the electrode holders 75 and 77, respectively, as shown particularly in FIGURE 2. Thereby reacting gases can be readily passed into contact with the electrode during operation of the fuel cell.

The flat face 87 of holder 75 engages the face of the cathode 11, thereby making electrical contact with the cathode 11, and also forces engagement of the cathode 11 with the electrolyte disk 15, holding the cathode 11 in place with the compressive force supplied by the springs 43, as described above. The flat face 89 or holder 77 engages the anode 13 through a porous, electrically conducting disk, preferably a metal screen 91 as shown in FIGURE 2. Another metal screen (not shown) similar to screen 91 may be interposed between the holder 75 and the cathode 11. The metal screen(s) promotes better electrical contact between the adjoining electrode holder and electrode; such screens also improve the gas flow patterns of the reacting gases. Passageways 93 and 95 are provided in holders 75 and 77, respectively, to conduct gases away from the electrode surfaces and to the respective annular passageways 71 and 73. Thus, reacting gases can enter the passageways 79 and 81 of the tubes 67 and 69, pass through the holes 83 and 85 to the faces 87 and 89, and react as previously described. The gases can exit the system through the holes 93 and 95 into passageways 71 and 73 and suitable exhaust lines 97 and 99 in communication with passageways 71 and 73, as shown in FIGURE 1.

Tubes 67 and 69 are held in adjustable pressure contact with their respective electrodes by the following arrangement: Each tube 67 and 69 is provided adjacent the outer end thereof with lugs 101, securely fixed to the outer surface thereof, but also adjustable. Bolts 103 extend from fittings 35 and 53 and are provided with threaded nuts 105. A suitable washer 107 is disposed around the tube 69 between the lug 101 and compression springs 109 extending around bolts 103 and abutting nuts 105. Another suitable washer 111 is disposed around tube 67 between the lug 101 and the nuts 105 on bolts 103. Tubes 67 and 69 are slidably received within holes 113 and 115 in fittings 35 and 53, respectively, holes 113 and 115 being lined with gas tight gaskets 117 and 119, respectively, of high temperature plastic, such as Teflon or nylon. By adjustment of nuts 105, compressive forces urging tubes 67 and 69 and their respective electrode holders against the electrode can be regulated.

A furnace 121 which can be resistance heated or the like is secured around the active portion of the fuel cell 9 containing the electrodes and electrolyte, as by the support blocks 123 connected to frame 41. The furnace 121 heats the active portion of the fuel cell to operating temperature (about 900–1100° C.). Oxidizing gas (air or purified oxygen) is passed into and out of contact with the cathode 11, while reducing gas (purified hydrogen or mixtures of $H_2$, CO, and $N_2$) is passed into and out of contact with the anode 13. The reacting gases are at desired pressure, for example, about atmospheric, and at a suitably high flow rate, for example about 25 ml./min. The metal tubes 67 and 69 are interconnected with an external electrical circuit (not shown) to conduct direct current developed by the fuel cell 9.

A typical fuel cell was constructed as described with reference to FIGURES 1 and 2 of the drawings. The fuel cell was operated at 1000° C., utilizing air as the oxidant at the cathode and a mixture of 10% hydrogen and 90% nitrogen saturated with water (at room temperature) as the reducing gas at the anode. A gas flow rate of about 20 ml. per minute at atmospheric pressure was maintained. The cathode area was 1.8 cm.$^2$ and that of the anode 2.8 cm.$^2$. Manganese oxide was utilized as the cathodic material, while nickel metal dispersed at a volume ratio of 1:3 in a porous matrix of zirconia-yttria was utilized as the anode. The electrolyte was non-porous zirconia containing 9 mol percent yttria. The electrolyte disk has a 1 inch diameter and 0.06 inch overall thickness with a 0.04 inch deep cup therein (having a major diameter of 0.75 inch and minor diameter of 0.50 inch) containing the anode. A thin nickel chrome screen was disposed between the anode and anode holder.

As shown in FIGURE 3 of the accompanying drawings, approximate open circuit voltage, using air as the oxidant (curve A), was about 0.93 volt, while with oxygen as the oxidant it was about 0.97 volt, (curve B). The ohmic resistance of the fuel cell itself was from about 0.5 to 1.0 ohm cm.$^2$, contributing a calculated 0.05 to 0.10 volt to the voltage drop at 100 ma./cm.$^2$. The cathodic polarization contributed 0.02 to 0.05 volt and the anodic polarization 0.15 volt to the voltage drop. Thus, an open-circuit voltage of 0.93 volt, using air as oxidant, (curve A) was only reduced to 0.63 volt at 100 ma./cm.$^2$ current density while a comparable reduction from 0.97 volt to 0.71 volt (curve B) also occurred at 100 ma./cm.$^2$ density when oxygen was used as the oxidant. Accordingly, the fuel cell performed efficiently over a range of current densities at 1000° C.

A second embodiment of a solid electrolyte fuel cell incorporating features of the present invention is illustrated in FIGURES 4 to 6, inclusive, of the accompanying drawings. The embodiment of FIGURES 4 to 6, inclusive, features an arrangement of parallel plate cell units, each of the cell units including a solid anode, a solid cathode and a solid electrolyte disposed between the cathode and anode and in contact therewith. The cell units are connected in series so that a fuel cell capable of producing power at high voltage is provided, which fuel cell has reduced current collection requirements at the individual electrodes. It will be understood that one or more of the fuel cells, such as illustrated in FIGURE 4, can also be electrically interconnected to provide a power supply of desired size and output.

Now referring more particularly to FIGURE 4 of the accompanying drawings, a fuel cell 125 capable of providing high power is illustrated in side elevation, portions being broken away to illustrate the internal construction thereof. The fuel cell 125 is generally cylindrical and includes an outer closed container or sheath 127 of a suitable high temperature metal, such as nickel-chromium alloy, to which are connected, as shown in FIGURE 5 in top plan view, suitable inlets and outlet ports (generally designated 129) for the passage of oxidant gas into the fuel cell 125 for contact with the cathodes of the electrode-electrolyte cell units 131 within the cell, for the removal of exhausted oxidant gas from the fuel cell, for the introduction of fuel gas (such as hydrogen) into the fuel cell 125 for contact with the anodes of the cell units 131, for the removal of reaction products (carbon oxides and water) from the fuel cell 125.

As shown more particularly in FIGURE 6 of the accompanying drawings, each of the cell units 131 comprises a thin plate or layer 133 of solid electrolyte, substantially impervious to gases in the fuel cell and constructed of materials substantially as previously described in connection with the embodiment illustrated in FIGURES 1 and 2 of the accompanying drawings. One side of layer 133 is in intimate contact with a solid porous cathode plate 135 and the opposite side of layer 133 is in intimate contact with a solid porous anode plate 137.

The anode and cathode are constructed substantially as previously described in connection with the embodiment of FIGURES 1 and 2. One or both of the electrodes is bonded to and forms a suitable support for the electrolyte layer 133 of each cell unit 131, and preferably has substantially the same coefficient of thermal expansion as the electrolyte layer. As with the embodiment of FIGURES 1 and 2, the anode is desirably bonded to, and even formed simultaneously with, the electrolyte layer. The cathode can, for example, be in mechanical contact with the electrolyte layer. Alternatively, the cathode can merely mechanically contact the electrolyte layer 133.

FIGURE 6 is an exploded view showing the electrode-electrolyte units spaced from one another and horizontally disposed in parallel plate arrangement within the fuel cell. Disposed between the respective units are electrically conductive, generally parallel separators 139, fabricated of suitable high temperature metal such as nickel-chromium alloy or the like, or an electronically conductive ceramic or ceramic-metal combination.

As shown in FIGURE 6, the separators 139 are preferably channel shaped or waffle shaped to provide alternating gas conducting passageways 141 and 143 on opposite sides thereof when each separator is placed in abutting relation to adjacent cell units 131. Disposed along the periphery on each side of each separator is an electrically non-codnuctive gasket 145, such as mica, adapted to seal the respective cell units 131 in gas tight relationship with the interposed separators 139. An electrically conductive gas permeable grid 147 is disposed radially and concentrically of each gasket 145 and is in direct contact with, in each instance, at least a portion of one side of the adjoining separator 139 and at least a portion of one side of the adjacent electrode of a cell unit 131, as shown in FIGURE 6. The grid 147 may be formed of a high temperature metal, such as a nickel-chromium alloy or the like. Such screen provides an electrical connection between the adjacent electrodes of the adjacent cell units 131 and the separators 139 between the respective cell units 131.

It will be understood that with the arrangement illustrated in FIGURE 6, any desired number of the parallel plate cell units 131 can be disposed in stacked relation and electrically interconnected in series through the respective interposed separators 139 and wire grids 147. The stacked electrically interconnected series of cell units 131 are disposed upon an electrically and thermally insulated bottom number 149 and are maintained in tight mechanical contact with one another by means of a spring 151 disposed between the bottom member 149 fabricated of any suitable material, and the closed bottom 153 of the fuel cell container 127, as shown in FIGURE 4, the upward movement of the stack of cell units 131 being limited by the closed top 155 of the container 127. Suitable electrical leads 157 and 159, extend from the bottom and top cell units 131, respectively, out through the container 127 for interconnection is an external circuit (not shown).

The entire series of units are thus sealed in gas tight relation along the periphery thereof by means of the gaskets 145. Oxidant gas (oxygen, air) passes into and out of contact with the cathodes of the cell units 131 through passageways 141 provided between the separators 139 and cathodes, and fuel gas, etc. (hydrogen) passes into and out of contact with the anodes of the cell units 131, by means of passageways 143 provided between the separators 139 and anodes.

Gases enter and exit regions 141 and 143 from holes 129 which extend down through all the series of stacked components in the gasket rim area, and which are gasketed or open to the exhause from the cathode side but not from the anode side, the reverse being the case for fuel gas flow.

The described fuel cell 125 of FIGURES 4 to 6 has the advantage of being fabricatable to practically any desired size and power requirements provided sufficient irreversible losses occur to allow the cell unit to maintain its temperature, and can be, as previously indicated, electrically interconnected with one or more other similar fuel cells to form an integrated power source. It will be understood that it may be desirable in some instances to also interconnect a plurality of such fuel cells with a common source of oxidant gas, with a common source of fuel gas, with suitable heat exchangers (not shown), etc.

The following table sets forth certain design data regarding a typical fuel cell constructed in accordance with the embodiment set forth in the FIGURES 4 to 6, inclusive, of the following drawings:

TABLE I

Number of cell units
  per fuel cell _____ 46.
Size of each cell unit _____ 0.2 inch high by 6 inches in diameter.
Active fuel cell height _____ 18 inches.
Overall fuel cell size _____ 24 inches high by 7 inches in diameter.
Surface area per cell _____ 5800 cm.$^2$.

A series of three such fuel cells can be electrically interconnected and be placed in series in the fuel gas flow to form an integrated power source. Three such fuel cells may have the characteristics set forth in Table II below:

TABLE II

| | Fuel Cell 1 | Fuel Cell 2 | Fuel Cell 3 |
|---|---|---|---|
| Standard state open circuit voltage, volts | .95 | .95 | .95 |
| Reduction in open circuit voltage due to fuel gas concentration at exit, volts | .02 | .06 | .17 |
| IR drop through electrolyte, volts | .05 | .05 | .05 |
| Other polarization, volts | .20 | .20 | .20 |
| Cell output voltage at 100 mamp./cm.$^2$, volts | .69 | .64 | .53 |
| Voltage per cell unit, volts | 31.7 | 29.4 | 24.4 |
| Power output, kwe | .40 | .37 | .31 |

The overall characteristics of the three fuel cell-interconnected power source are set forth in Table III below:

TABLE III

Total energy input,
  B.t.u./hr. _____ 6830.
Total power outpunt,
  kwe. _____ 1.08.
Overall efficiency, percent_ 54.
Oxidant _____ Air (1 atm. pressure).
Fuel gas, inlet composition, dry basis _____ About 75% $H_2$ and 25% CO (1 atm. pressure).
Operating temperature ___ 1000° C.

The data set forth in Tables I, II and III clearly illustrate the large power output that can be readily obtained with relatively high efficiency from the fuel cells constructed as illustrated in FIGURES 4 to 6, inclusive, of the accompanying drawings.

Accordingly, an efficient, durable high temperature solid electrolyte fuel cell capable of operating at high current densities is provided in accordance with the present invention. The fuel cell employs a solid electrolyte having low gas permeability and electrodes exhibiting low polarization in use. One or both electrodes are in the form of an electrically conductive metal or metallic oxide in powder form dispersed in an effective concentration in a porous matrix of solid ceramic material, preferable basically the same material as the electrolyte. Also such electrode or electrodes are utilized to provide a supporting structure for the electrolyte, and are bonded thereto and have about the same coefficient of thermal expansion as the electrolyte to prevent cracking of the bond therebetween during thermal cycling of the fuel cell. A plurality of the electrode-electrolyte-electrode units can be arranged for series electrical interconnection to provide a fuel cell of desired power output, and a plurality of the fuel cells can be electrically interconnected to form a power supply of desired size. Other advantages of the present invention are as set forth in the foregoing.

Various of the features of the present invention are set forth in the appended claims.

What is claimed is:

1. A solid electrolyte high temperature fuel cell comprising, a solid gas impervious ceramic electrolyte consisting of zirconia which has in solid solution therewith between about 7 mole percent and about 20 mole percent yttria, a solid gas porous cathode in contact with said electrolyte, said cathode comprising a porous non-conductive ceramic matrix of the same composition as said electrolyte having uniformly dispersed therein an amount of manganese oxide sufficient to effect electrical conduction through said cathode, and a solid gas porous anode in contact with said electrolyte, said anode comprising a porous non-conductive ceramic matrix of the same composition as said electrolyte having uniformly dispersed therein an amount of nickel sufficient to effect electrical conduction through said anode.

2. A solid electrolyte high temperature fuel cell comprising, a solid gas impervious ceramic electrolyte consisting of zirconia having in solid solution therewith a sufficient amount of a compound selected from the group consisting of alkaline earth oxides, rare earth oxides, yttria, scandia and mixtures thereof to provide oxide vacancies in the crystal structure of said zirconia, said electrolyte being disposed between and in intimate contact with a solid gas porous anode and a solid gas porous cathode, said anode including a porous non-conductive ceramic matrix having dispersed therein an electrically conductive catalytic material selected from the group consisting of nickel, cobalt, chromium, platinum, titanium oxide and mixtures thereof in an amount sufficient to effect electrical conduction through said anode, said cathode including a porous non-conductive ceramic matrix having dispersed therein an electrically conductive catalytic material selected from the group consisting of manganese oxide, copper oxide, cobalt oxide, nickel oxide, platinum, silver, silver-copper alloys and mixtures thereof in an amount sufficient to effect electrical conduction through said cathode, at least one of said anode and said cathode being bonded to said electrolyte for providing mechanical support thereto, and having a coefficient of expansion substantially the same as the coefficient of expansion of said electrolyte, means for supplying a fuel gas to said anode, means for supplying an oxidizing gas to said cathode, and means for electrically connecting a load across said anode and cathode.

3. A solid electrolyte high temperature fuel cell comprising, a solid gas impervious ceramic electrolyte consisting of zirconia having in solid solution therewith a sufficient amount of a compound selected from the group consisting of alkaline earth oxides, rare earth oxides, yttria, scandia and mixtures thereof to provide oxide vacancies in the crystal structure of said zirconia, said electrolyte being disposed between and bonded to a solid gas porous ceramic anode and a solid gas porous ceramic cathode, said anode including a porous non-conductive ceramic matrix having dispersed therein an amount of a nickel catalyst sufficient to effect electrical conduction through said anode, said cathode including a porous non-conductive ceramic matrix having dispersed therein an amount of a manganese oxide catalyst sufficient to effect electrical conduction through said cathode, said anode and cathode having a coefficient of expansion substantially the same as the coefficient of expansion of said electrolyte, means for supplying a fuel gas to said anode, means for supplying an oxidizing gas to said cathode, and means for electrically connecting a load across said anode and cathode.

References Cited by the Examiner

UNITED STATES PATENTS

| 2,914,596 | 11/1959 | Gorin et al. | 136—86 |
| 2,976,342 | 3/1961 | Morehouse et al. | 136—86 X |
| 2,980,749 | 4/1961 | Broers | 136—86 |
| 3,040,115 | 6/1962 | Moos | 136—86 X |
| 3,061,658 | 10/1962 | Blackmer | 136—86 X |
| 3,097,115 | 7/1963 | Moos | 136—120 |
| 3,101,285 | 8/1963 | Tantram et al. | 136—86 X |
| 3,138,488 | 6/1964 | Tragert | 136—86 X |
| 3,160,527 | 12/1964 | Hess | 136—86 |

OTHER REFERENCES

Auidinics, Jan. 28, 1963, page 69.

Journal of the Electrochemical Soc., vol. 104, June 1957, pages 379–386.

United States Atomic Energy Commission "Measurements on Galvanic Cells Involving Solid Electrolytes," by Kiukkola et al., pages 1–8, August 1956.

WINSTON A. DOUGLAS, *Primary Examiner.*

JOHN H. MACK, *Examiner.*

H. FEELEY, A. B. CURTIS, *Assistant Examiners.*